(12) United States Patent
Chi et al.

(10) Patent No.: US 12,555,808 B2
(45) Date of Patent: Feb. 17, 2026

(54) WARMING-UP CONTROL METHOD IN STARTING PROCESS OF FUEL CELL SYSTEM AND FUEL CELL SYSTEM

(71) Applicant: GUANGDONG YUNTAO HYDROGEN ENERGY TECHNOLOGY CO., LTD., Guangzhou (CN)

(72) Inventors: Bin Chi, Guangzhou (CN); Qiang Yang, Guangzhou (CN); Jiajun Li, Guangzhou (CN); Liang Lu, Guangzhou (CN)

(73) Assignee: GUANGDONG YUNTAO HYDROGEN ENERGY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/208,558

(22) Filed: May 14, 2025

(65) Prior Publication Data

US 2025/0273715 A1 Aug. 28, 2025

Related U.S. Application Data

(63) Continuation of application No. PCT/CN2024/107480, filed on Jul. 25, 2024.

(30) Foreign Application Priority Data

Jan. 19, 2024 (CN) .......................... 202410079302.6

(51) Int. Cl.
*H01M 8/04746* (2016.01)
*H01M 8/04302* (2016.01)
(Continued)

(52) U.S. Cl.
CPC ... *H01M 8/04768* (2013.01); *H01M 8/04302* (2016.02); *H01M 8/04328* (2013.01);
(Continued)

(58) Field of Classification Search
CPC ......... H01M 8/04768; H01M 8/04302; H01M 8/04328; H01M 8/04335; H01M 8/04552;
(Continued)

(56) References Cited

U.S. PATENT DOCUMENTS

| 6,534,208 B1 * | 3/2003 | Zinser | ............... H01M 8/04753 |
| | | | 429/432 |
| 11,757,116 B1 | 9/2023 | Zaag et al. | |

(Continued)

FOREIGN PATENT DOCUMENTS

| CN | 112086666 A | 12/2020 |
| CN | 115224303 A | 10/2022 |

(Continued)

*Primary Examiner* — Christian Roldan

(57) ABSTRACT

The present application relates to a warming-up control method for a fuel cell system in a starting process and a fuel cell system, applied to the technical field of fuel cells. The method includes: starting the fuel cell system, turning on a small-cycle cooling circuit, and pull-loading an output power to a first power; in response to an inlet temperature of a stack reaching a first temperature, rotating a three-way valve at a first rotating rate; calculating a variance of a cell voltage value; in response to the variance being smaller than a third threshold and reducing the variance to be within the first threshold, returning to the rotating the three-way valve at the first rotating rate until all turn-on of a large-cycle cooling circuit and all turn-off of the small-cycle cooling circuit; pull-loading the output power to a rated power.

7 Claims, 2 Drawing Sheets

(51) Int. Cl.
*H01M 8/0432* (2016.01)
*H01M 8/04537* (2016.01)
*H01M 8/04858* (2016.01)

(52) U.S. Cl.
CPC ... *H01M 8/04335* (2013.01); *H01M 8/04552* (2013.01); *H01M 8/0494* (2013.01)

(58) Field of Classification Search
CPC .......... H01M 8/0494; H01M 8/04274; H01M 8/04089
See application file for complete search history.

(56) References Cited

U.S. PATENT DOCUMENTS

| | | | | |
|---|---|---|---|---|
| 2004/0229088 | A1* | 11/2004 | Hayashi | H01M 8/04395 429/432 |
| 2011/0171549 | A1* | 7/2011 | Kato | H01M 8/04225 429/429 |
| 2021/0376348 | A1* | 12/2021 | Namba | H01M 8/0494 |
| 2022/0416269 | A1* | 12/2022 | Ancimer | H01M 8/249 |

FOREIGN PATENT DOCUMENTS

| | | |
|---|---|---|
| CN | 115954505 A | 4/2023 |
| CN | 117317306 A | 12/2023 |
| CN | 117334961 A | 1/2024 |
| CN | 117594838 A | 2/2024 |
| WO | 2022135016 A1 | 6/2022 |

\* cited by examiner

WARMING-UP CONTROL METHOD IN STARTING PROCESS OF FUEL CELL SYSTEM AND FUEL CELL SYSTEM

CROSS-REFERENCE TO RELATED APPLICATIONS

This application is a continuation of International Patent Application No. PCT/CN2024/107480, filed on Jul. 25, 2024, which claims the benefit of priority from Chinese Patent Application No. 202410079302.6, filed on Jan. 19, 2024. The content of the aforementioned applications, including any intervening amendments thereto, are incorporated herein by reference.

TECHNICAL FIELD

The present application relates to the technical field of fuel cells, and in particular, to a warming-up control method for a fuel cell system in a starting process and a fuel cell system.

BACKGROUND

A hydrogen fuel cell is a kind of green energy conversion apparatuses, having the advantages of high energy conversion efficiency, zero emission, fast startup at a low temperature, etc. Thus, it will have a broad application prospect in the field of new energy vehicles.

In a starting process of a fuel cell system, in order to make a temperature of a stack quickly reach that at which it can run at a rated operating point, a small-cycle cooling circuit runs if the stack does not reach a predetermined temperature in a low power section; and then it switches to run a large-cycle cooling circuit if the temperature of the stack reaches the predetermined temperature. However, this process can easily lead to a fluctuation in an internal temperature of the stack and affect a stable output power of the fuel cell system. Gas humidity supersaturation easily occurring inside the stack affects diffusion of gas inside the stack. Also, facing a risk of a low cell voltage of the stack, it will lead to a failure in system warming up and then a failure in normal startup in a case of a serious low cell voltage. Long-term occurrence of such problem will affect service lives of the stack and the system.

SUMMARY

In order to solve the above technical problems, the present application provides a warming-up control method for a fuel cell system in a starting process, a fuel cell system, a storage medium, and a computer program product.

According to a first aspect of the present application, a warming-up control method for a fuel cell system in a starting process is provided, including:
  starting the fuel cell system, introducing hydrogen and air into a stack, turning on a small-cycle cooling circuit, and pull-loading an output power of the fuel cell system to a first power;
  running the fuel cell system at the first power, and monitoring an inlet temperature of the stack in real time;
  in response to the inlet temperature reaching a first temperature, rotating a three-way valve at a first rotating rate, so as to gradually turn on a large-cycle cooling circuit and gradually turn off the small-cycle cooling circuit at the same time;
  monitoring a cell voltage value of the stack in real time, and calculating a voltage variance based on the cell voltage value;
  in response to the voltage variance being smaller than or equal to a first threshold, returning to the step of rotating a three-way valve at a first rotating rate until all turn-on of the large-cycle cooling circuit and all turn-off of the small-cycle cooling circuit;
  subsequent to all turn-on of the large-cycle cooling circuit and all turn-off of the small-cycle cooling circuit, pull-loading the output power of the fuel cell system to a rated power;
  in response to the voltage variance being larger than the first threshold and smaller than or equal to a second threshold, rotating the three-way valve at a second rotating rate until the voltage variance is smaller than or equal to the first threshold, and returning to the step of rotating a three-way valve at a first rotating rate, wherein the second rotating rate is smaller than the first rotating rate;
  in response to the voltage variance being larger than the second threshold and smaller than or equal to a third threshold, decreasing the output power of the fuel cell system from the first power to a second power;
  running the fuel cell system at the second power, and monitoring the inlet temperature of the stack in real time;
  in response to the inlet temperature reaching a second temperature, rotating the three-way valve at a third rotating rate until the voltage variance is smaller than or equal to the first threshold, and returning to the step of rotating a three-way valve at a first rotating rate, wherein the third rotating rate is smaller than the second rotating rate, and the second temperature is smaller than the first temperature; and
  in response to the voltage variance being larger than the third threshold, determining that the fuel cell system fails and stops starting.

Optionally, the method further includes:
  increasing amounts of the hydrogen and air introduced while rotating the three-way valve at the third rotating rate.

Optionally, the method further includes:
  in response to the voltage variance being larger than the first threshold and smaller than or equal to the second threshold, triggering a level-one warming-up alarm;
  in response to the voltage variance being larger than the second threshold and smaller than or equal to a third threshold, triggering a level-two warming-up alarm; and
  in response to the voltage variance being larger than the third threshold, triggering a level-three warming-up fault.

Optionally, the pull-loading an output power of the fuel cell system to a first power includes:
  pull-loading the output power of the fuel cell system to the first power at a preset pull-loading rate.

Optionally, the first rotating rate is 20°/s, the second rotating rate is 10°/s, and the third rotating rate is 5°/s.

Optionally, the first threshold is 200 mV, the second threshold is 400 mV, and the third threshold is 1000 mV.

According to a second aspect of the present application, a fuel cell system is provided, including a stack, a large-cycle cooling circuit, a small-cycle cooling circuit, a control module, a temperature monitoring module, and a voltage monitoring module, where
  the control module is configured for starting the fuel cell system, introducing hydrogen and air into a stack, turning on the small-cycle cooling circuit, pull-loading an output power of the fuel cell system to a first power, and running the fuel cell system at the first power;

the temperature monitoring module is configured for monitoring an inlet temperature of the stack in real time in running the fuel cell system at the first power;

the control module is further configured for, in response to the inlet temperature reaching a first temperature, rotating a three-way valve at a first rotating rate, so as to gradually turn on a large-cycle cooling circuit and gradually turn off the small-cycle cooling circuit at the same time;

the voltage monitoring module is configured for monitoring a cell voltage value of the stack in real time;

the control module is further configured for calculating a voltage variance based on the cell voltage value; in response to the voltage variance being smaller than or equal to a first threshold, returning to the step of rotating a three-way valve at a first rotating rate until all turn-on of the large-cycle cooling circuit and all turn-off of the small-cycle cooling circuit, and subsequent to all turn-on of the large-cycle cooling circuit and all turn-off of the small-cycle cooling circuit, pull-loading the output power of the fuel cell system to the rated power;

in response to the voltage variance being larger than the first threshold and smaller than or equal to a second threshold, rotating the three-way valve at a second rotating rate until the voltage variance is smaller than or equal to the first threshold, and returning to the step of rotating a three-way valve at a first rotating rate, wherein the second rotating rate is smaller than the first rotating rate; and in response to the voltage variance being larger than the second threshold and smaller than or equal to a third threshold, decreasing the output power of the fuel cell system from the first power to a second power, and running the fuel cell system at the second power;

the temperature monitoring module is configured for monitoring the inlet temperature of the stack in real time in running the fuel cell system at the second power;

the control module is further configured for, in response to the inlet temperature reaching a second temperature, rotating the three-way valve at a third rotating rate until the voltage variance is smaller than or equal to the first threshold, and returning to the step of rotating a three-way valve at a first rotating rate, wherein the third rotating rate is smaller than the second rotating rate, and the second temperature is smaller than the first temperature; and in response to the voltage variance being larger than the third threshold, determining that the fuel cell system fails and stops starting.

Optionally, the control module is specifically configured for increasing amounts of the hydrogen and air introduced while rotating the three-way valve at the third rotating rate.

Optionally, the control module is further configured for, in response to the voltage variance being larger than the first threshold and smaller than or equal to the second threshold, triggering a level-one warming-up alarm; in response to the voltage variance being larger than the second threshold and smaller than or equal to a third threshold, triggering a level-two warming-up alarm; and in response to the voltage variance being larger than the third threshold, triggering a level-three warming-up fault.

Optionally, the control module is specifically configured for pull-loading the output power of the fuel cell system to the first power at a preset pull-loading rate.

Optionally, the first rotating rate is 20°/s, the second rotating rate is 10°/s, and the third rotating rate is 5°/s.

Optionally, the first threshold is 200 mV, the second threshold is 400 mV, and the third threshold is 1000 mV.

According to a third aspect of the present application, a computer-readable storage medium is provided, storing a computer program, where the computer program, when being executed by a processor, implements the method according to the first aspect.

According to a fourth aspect of the present application, a computer program product is provided. The computer program product, when running on a computer, causes the computer to perform the method according to the first aspect.

Compared with the prior art, the technical solution provided by the embodiment of the present application has the advantages as follows:

In the starting process of the fuel cell system, a warming-up state of the fuel cell system is judged by monitoring a cell voltage, so as to automatically switch the warming-up control method and then ensure successful warming up. Specifically, if the voltage variance is smaller than or equal to the first threshold, it represents a good state. So, it continues to rotate the three-way valve at the first rotating rate until all turn-on of the large-cycle cooling circuit and all turn-off of the small-cycle cooling circuit. Subsequent to all turn-on of the large-cycle cooling circuit and all turn-off of the small-cycle cooling circuit, the output power of the fuel cell system is pull-loaded to a rated power. If the voltage variance is larger than the first threshold and smaller than or equal to the second threshold, it represents a poor state. So, the three-way valve is rotated at the second rotating rate, until the voltage variance is smaller than or equal to the first threshold; and it returns to the step of rotating a three-way valve at a first rotating rate, where the second rotating rate is smaller than the first rotating rate. If the voltage variance is larger than the second threshold and smaller than or equal to the third threshold, it represents a very poor state. So, the output power of the fuel cell system is decreased from the first power to the second power, the fuel cell system runs at the second power, and the inlet temperature of the stack is monitored in real time. If the inlet temperature reaches the second temperature, the three-way valve is rotated at the third rotating rate, until the voltage variance is smaller than or equal to the first threshold, and it returns to the step of rotating a three-way valve at a first rotating rate. If the voltage variance is larger than the third threshold, it is determined that the fuel cell system fails and stops starting. The embodiments of the present application can effectively reduce the fluctuation of the internal temperature of the stack during warming up, stabilize the output power of the system, and enable the fuel cell system to be quickly warmed up and enter a normal operating state. In a case that the small-cycle cooling circuit is gradually switched to the large-cycle cooling circuit, it can effectively solve supersaturation of water vapor inside the stack during warming up, avoid serious flooding in warming up the stack, further avoid an unstable voltage change of the stack during warming up, and prolong the service life of the stack.

BRIEF DESCRIPTION OF DRAWINGS

The drawings here are incorporated into the specification and constitute a part of the specification, show the embodiments that comply with the present application, and are used together with the specification for explaining the principles of the present application.

In order to describe the technical solutions in embodiments of the present application or the prior art more clearly, the accompanying drawings required for describing the embodiments or the prior art will be briefly described below. Apparently, a person of ordinary skill in the art can also derive other accompanying drawings from these accompanying drawings without creative efforts.

DETAILED DESCRIPTION OF THE EMBODIMENTS

Figure 1:
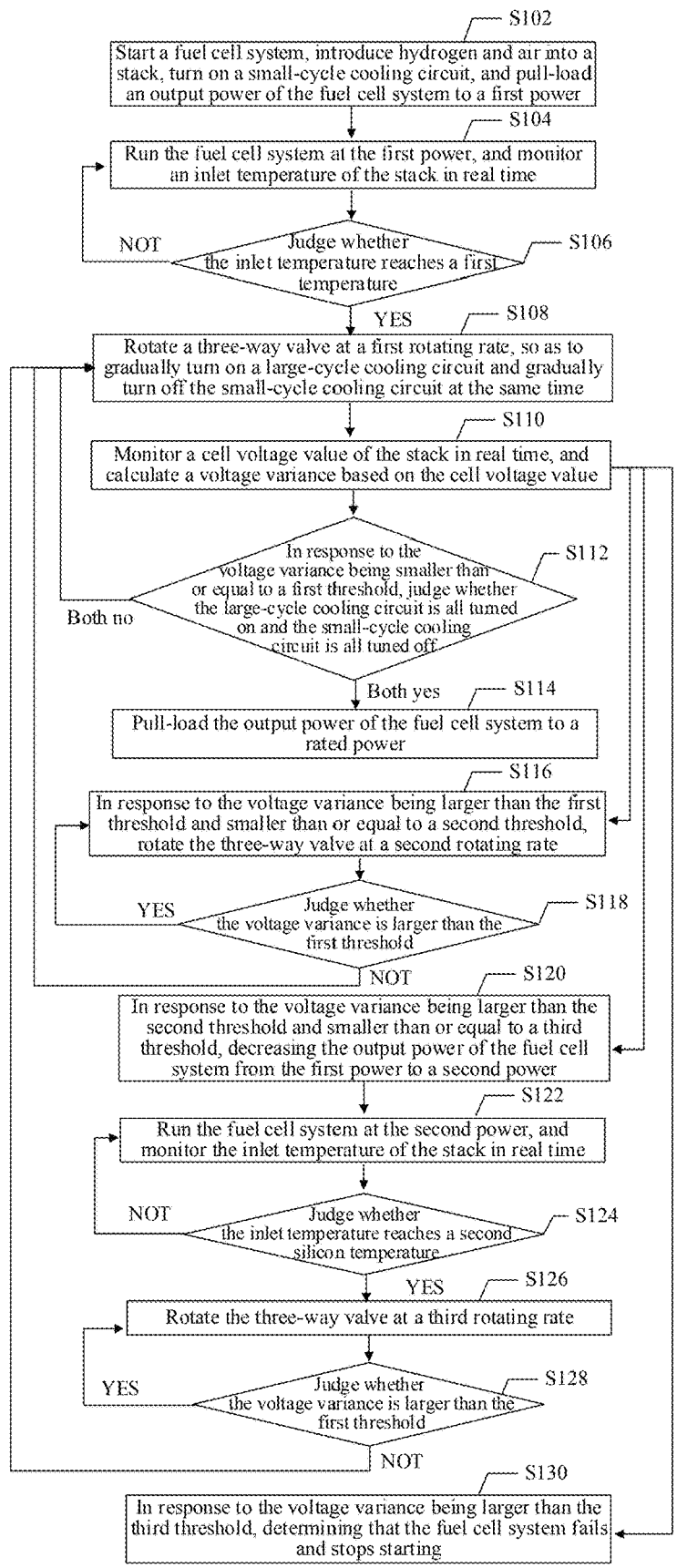
FIG. 1 is a flowchart of a warming-up control method for a fuel cell system in a starting process according to an embodiment of the present application.

To more clearly understand the objective, technical solutions and advantages of the present application, the solution of the present application will be further described below. It is to be noted that the embodiments and features in the embodiments of the present application may be combined with each other without conflict.

Many specific details are set forth in the following description to facilitate a full understanding of the present application, but the present application can also be implemented in other ways different from those described here. Apparently, the embodiments in the specification are only part rather than all of the embodiments of the present application.

With the promotion of hydrogen energy, a hydrogen fuel cell has attracted wide attention. Application of the hydrogen fuel cell in the field of automobiles, especially promotion in the field of heavy commercial vehicles, will be conducive to promoting energy conservation and emission reduction of the automobiles.

In the starting process of the fuel cell system, it is necessary to warm up the fuel cell system. After the stack is raised to a certain temperature, the stack will operate normally at a rated power. The warming up process relies on self-produced heat of the stack in the starting process to heat the stack and cooling circulating water. A cooling circulation system of the fuel cell system is generally provided with a small-cycle cooling circuit and a large-cycle cooling circuit.

In an initial starting stage, due to a low output power and less heat produced of the stack, in the process, the small-cycle cooling circuit is turned on, which can quickly heat up the stack and cooling water in a small cycle. After the stack is heated to a certain temperature, the output power is also increased. In order to ensure the stable temperature of the stack, more cooling water is needed to bring out the heat produced by the stack; and at this time, it is necessary to turn on the large-cycle cooling circuit. In warming up the fuel cell system, when the cooling circulation system is switched from the small-cycle cooling circuit to the large-cycle cooling circuit, the temperature inside the stack is prone to fluctuating, which descends the temperature of the cooling circulating water inside the stack, resulting in weakening in performance of the stack. In a severe case, a low cell voltage of the stack will occur, triggering a low cell voltage alarm, and even causing shutdown of the system.

In order to solve the above problems, the embodiments of the present application provide the warming-up control method for the fuel cell system in the starting process, the fuel cell system, the storage medium, and the computer program product, which can effectively reduce the fluctuation of the internal temperature of the stack during warming up, stabilize the output power of the system, and enable the fuel cell system to be quickly warmed up and enter a normal operating state. Therefore, it can effectively solve supersaturation of the water vapor inside the stack during warming up, avoid serious flooding in warming up the stack, avoid an unstable voltage change of the stack during warming up, and prolong a service life of the stack.

Referring to FIG. 1, it is a flowchart of a warming-up control method for a fuel cell system in a starting process according to an embodiment of the present application. The warming-up control method may include the following steps:

Step S102, starting the fuel cell system, introducing hydrogen and air into a stack, turning on a small-cycle cooling circuit, and pull-loading an output power of the fuel cell system to a first power.

In an initial starting stage, due to a low output power and less heat produced of the stack, in the process, the small-cycle cooling circuit is turned on, which can quickly heat up the stack and cooling water in a small cycle. After the stack is heated to a certain temperature, the output power is also increased. The output power of the fuel cell system may be pull-loaded to the first power (such as 40 kW) at a preset pull-loading rate (such as 10 A/s).

Step S104, running the fuel cell system at the first power, and monitoring an inlet temperature of the stack in real time.

In running the fuel cell system at the first power, the inlet temperature of the stack is gradually raised, and may be monitored in real time.

Step S106, judging whether the inlet temperature reaches the first temperature.

If the inlet temperature reaches the first temperature (for example, 55° C.), step S108 is executed. If the inlet temperature does not reach the first temperature, it returns to step S104, that is, it continues to run the fuel cell system at the first power.

Step S108, rotating a three-way valve at a first rotating rate, so as to gradually turn on a large-cycle cooling circuit and gradually turn off the small-cycle cooling circuit at the same time.

At present, the small-cycle cooling circuit has been turned on. In rotating the three-way valve, the large-cycle cooling circuit is gradually turned on, and the small-cycle cooling circuit is gradually turned off at the same time. The larger the rotating rate of the three-way valve is, the faster the turn-on rate of the large-cycle cooling circuit and the turn-off rate of the small-cycle cooling circuit are. In the embodiment of the present application, a proper first rotating rate (for example, the first rotating rate may be 20°/s) may be preset to rotate the three-way valve, and a warming-up state of the system is judged by monitoring a cell voltage.

Step S110, monitoring a cell voltage value of the stack in real time, and calculating a voltage variance based on the cell voltage value.

In rotating the three-way valve at the first rotating rate, the cell voltage value of the stack is monitored in real time, and the voltage variance is calculated based on the cell voltage value. The voltage variance represents a dispersion degree of the cell voltage. The larger the voltage variance is, the poorer the warming-up state is; while the smaller the voltage variance is, the better the warming-up state is.

Step S112, in response to the voltage variance being smaller than or equal to a first threshold, judging whether the large-cycle cooling circuit is all turned on and the small-cycle cooling circuit is all tuned off.

In the embodiment of the present application, if the voltage variance is smaller than or equal to the first threshold, it represents a good warming-up state of the system, and it is judged whether the large-cycle cooling circuit is all turned on and the small-cycle cooling circuit is all tuned off. The first threshold may be 200 mV, etc. If the large-cycle cooling circuit is not all turned on and the small-cycle cooling circuit is not all tuned off, it returns to step S108 and continues to rotate the three-way valve at the first rotating rate. If the large-cycle cooling circuit is all turned on and the small-cycle cooling circuit is all tuned off, step S114 is executed.

Step S114, pull-loading the output power of the fuel cell system to a rated power.

In a case of all turning on the large-cycle cooling circuit and all turning off the small-cycle cooling circuit, the fuel cell system enters a normal pull-loading stage until rated power output.

Step S116, in response to the voltage variance being larger than the first threshold and smaller than or equal to a second threshold, rotating the three-way valve at a second rotating rate, where the second rotating rate is smaller than the first rotating rate.

If the voltage variance is larger than the first threshold and smaller than or equal to a second threshold, it represents a poor, but not very poor, warming-up state of the system; and at this time, the warming-up state of the system can be adjusted by reducing the rotating rate of the three-way valve. The second threshold may be 400 mV, and the second rotating rate may be 10°/s.

Optionally, if the voltage variance is larger than the first threshold and smaller than or equal to the second threshold, a level-one warming-up alarm may be triggered.

Step S118, judging whether the voltage variance is larger than the first threshold.

In rotating the three-way valve at the second rotating rate, the cell voltage value of the stack is stilled monitored in real time, and the voltage variance is calculated based on the cell voltage value. If the voltage variance is larger than the first threshold, it continues to rotate the three-way valve at the second rotating rate. If the voltage variance is smaller than or equal to the first threshold, it returns to step S108, that is, rotating the three-way valve at the first rotating rate.

Step S120, in response to the voltage variance being larger than the second threshold and smaller than or equal to a third threshold, decreasing the output power of the fuel cell system from the first power to a second power.

If the voltage variance is larger than the second threshold and smaller than or equal to the third threshold which may be 1000 mV, it represents a very poor warming-up state of the system. At this time, the output power of the fuel cell system may be decreased to the second power first, for example, the first power is 40 kW, and the second power may be 300 kW.

Optionally, if the voltage variance is larger than the second threshold and smaller than or equal to the third threshold, a level-two warming-up alarm is triggered. In this way, maintenance personnel of the fuel cell system can grasp the current warming-up state of the system in time by triggering the level-one warming-up alarm or the level-two warming-up alarm. It can be seen that compared with the warming-up control method in triggering the level-two warming-up alarm, the warming-up control method in triggering the level-one warming-up alarm includes simpler steps and is also faster in a speed of starting the fuel cell system.

Step S122, running the fuel cell system at the second power, and monitoring the inlet temperature of the stack in real time.

Similar to the forgoing step S104, the fuel cell system runs at the second power, and the inlet temperature of the stack is monitored in real time.

Step S124, judging whether the inlet temperature reaches a second temperature.

If the inlet temperature reaches the second temperature, step S126 is executed. If the inlet temperature does not reach the second temperature, it returns to step S122, and continues to run the fuel cell system at the second power. The second temperature is smaller than the first temperature; the first temperature, for example, may be 55° C.; and the second temperature, for example, may be 50° C.

Step S126, rotating the three-way valve at a third rotating rate.

In the embodiment of the present application, the third rotating rate is smaller than the second rotating rate, and may be 5°/s. That is, in a case of the very poor warming-up state of the system, the warming-up state of the system is adjusted by decreasing the output power of the fuel cell system, the inlet temperature of the stack and further the rotating rate of the three-way valve.

Optionally, amounts of the hydrogen and air introduced may be increased to further adjust the warming-up state of the system while the three-way valve is rotated at the third rotating rate. For example, a rotating speed of a hydrogen circulation pump may be increased to 5000 Rpm, and a metering ratio of the air may be increased to 2.3.

Step S128, judging whether the voltage variance is larger than the first threshold.

In rotating the three-way valve at the third rotating rate, the cell voltage value of the stack is stilled monitored in real time, and the voltage variance is calculated based on the cell voltage value. If the voltage variance is larger than the first threshold, it returns to step S126. If the voltage variance is smaller than or equal to the first threshold, it returns to step S108.

Step S130, in response to the voltage variance being larger than the third threshold, determining that the fuel cell system fails and stops starting.

Optionally, if the voltage variance is larger than the third threshold, a level-three warming-up fault is triggered. In this way, the maintenance personnel can grasp in time that the fuel cell system fails.

The warming-up control method for the fuel cell system in the starting process provided by the embodiment of the present application judges the warming-up state of the fuel cell system by monitoring the cell voltage value to automatically switch the warming-up control method, which can effectively reduce the fluctuation of the internal temperature of the stack during warming up, stabilize the output power of the system, and enable the fuel cell system to be quickly warmed up and enter a normal operating state. In a case that the small-cycle cooling circuit is gradually switched to the large-cycle cooling circuit, it can effectively solve supersaturation of water vapor inside the stack during warming up, avoid serious flooding in warming up the stack, further avoid an unstable voltage change of the stack during warming up, and prolong the service life of the stack.

Figure 2:
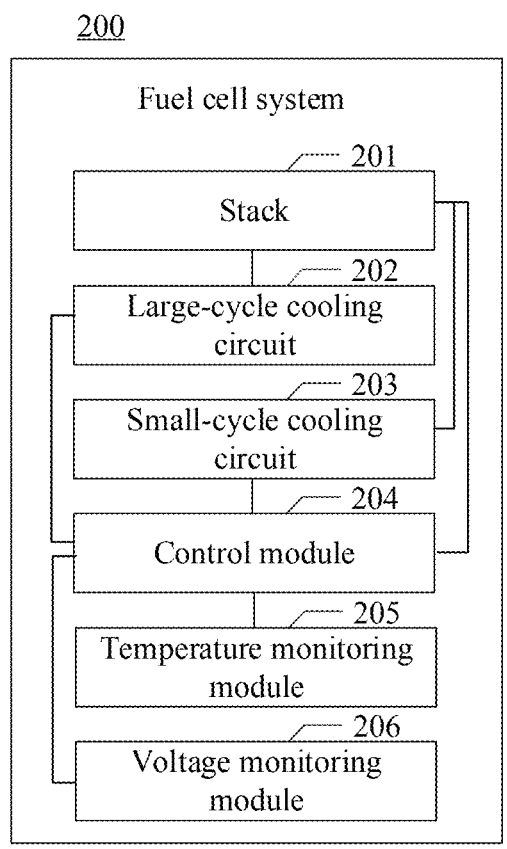
FIG. 2 is a schematic structural diagram of a fuel cell system according to an embodiment of the present application.

Corresponding to the above method embodiment, the embodiment of the present application further provides a fuel cell system. Referring to FIG. 2, the fuel cell system 200 includes a stack 201, a large-cycle cooling circuit 202, a small-cycle cooling circuit 203, a control module 204, a temperature monitoring module 205, and a voltage monitoring module 206.

The control module 204 is configured for starting the fuel cell system, introducing hydrogen and air into the stack 201, turning on the small-cycle cooling circuit 203, pull-loading an output power of the fuel cell system to a first power, and running the fuel cell system at the first power.

The temperature monitoring module 205 is configured for monitoring an inlet temperature of the stack in real time in running the fuel cell system at the first power.

The control module 204 is further configured for, in response to the inlet temperature reaching a first temperature, rotating a three-way valve at a first rotating rate, so as to gradually turn on a large-cycle cooling circuit and gradually turn off the small-cycle cooling circuit at the same time.

The voltage monitoring module 206 is configured for monitoring a cell voltage value of the stack in real time.

The control module 204 is further configured for calculating a voltage variance based on the cell voltage value; in response to the voltage variance being smaller than or equal to a first threshold, returning to the step of rotating a three-way valve at a first rotating rate until all turn-on of the large-cycle cooling circuit and all turn-off of the small-cycle cooling circuit, and subsequent to all turn-on of the large-cycle cooling circuit and all turn-off of the small-cycle cooling circuit, pull-loading the output power of the fuel cell system to the rated power;
  in response to the voltage variance being larger than the first threshold and smaller than or equal to a second threshold, rotating the three-way valve at a second rotating rate until the voltage variance is smaller than or equal to the first threshold, and returning to the step of rotating a three-way valve at a first rotating rate, where the second rotating rate is smaller than the first rotating rate; and
  in response to the voltage variance being larger than the second threshold and smaller than or equal to a third threshold, decreasing the output power of the fuel cell system from the first power to a second power, and running the fuel cell system at the second power.

The temperature monitoring module 205 is configured for monitoring the inlet temperature of the stack in real time in running the fuel cell system at the second power.

The control module 204 is further configured for, in response to the inlet temperature reaching a second temperature, rotating the three-way valve at a third rotating rate until the voltage variance is smaller than or equal to the first threshold, and returning to the step of rotating a three-way valve at a first rotating rate, where the third rotating rate is smaller than the second rotating rate, and the second temperature is smaller than the first temperature; and If the voltage variance is larger than the third threshold, it is determined that the fuel cell system fails and stops starting.

Optionally, the control module 204 is specifically configured for increasing amounts of the hydrogen and air introduced while rotating the three-way valve at the third rotating rate.

Optionally, the control module 204 is further configured for, in response to the voltage variance being larger than the first threshold and smaller than or equal to the second threshold, triggering a level-one warming-up alarm; in response to the voltage variance being larger than the second threshold and smaller than or equal to the third threshold, triggering a level-two warming-up alarm; and in response to the voltage variance being larger than the third threshold, triggering a level-three warming-up fault.

Optionally, the control module 204 is specifically configured for pull-loading the output power of the fuel cell system to the first power at a preset pull-loading rate.

Optionally, the first rotating rate is 20°/s, the second rotating rate is 10°/s, and the third rotating rate is 5°/s.

Optionally, the first threshold is 200 mV, the second threshold is 400 mV, and the third threshold is 1000 m V.

The specific details of each module or unit in the system have been described in detail in the corresponding method, so they are not repeated here.

It is to be noted that although several modules or units of equipment used for action execution are mentioned in detail above, this division is not mandatory. In fact, according to the implementation of the present application, the features and functions of the two or more modules or units described above can be embodied in one module or unit. On the contrary, the features and functions of one module or unit described above can be further divided to be embodied by a plurality of modules or units.

In the embodiment of the present application, a computer-readable storage medium is further provided, storing a computer program, where the computer program, when being executed by a processor, implements the above warming-up control method for the fuel cell system in the starting process.

It is to be noted that the computer-readable storage medium shown in the present application may be, for example, but not limited to, an electronic, magnetic, optical, electromagnetic, infrared, or semiconductor system, apparatus, or device, or any combination of the above. More specific examples of the computer-readable storage medium may include, but not limited to, a portable computer magnetic disk, a hard disk, a random access memory, a read-only memory, an erasable programmable read-only memory (EPROM) or a flash memory, an optical fiber, a portable compact disk read-only memory (CD-ROM), an optical storage device, and a magnetic storage device that are each electrically connected through one or more wires, or any suitable combination of the above. In the present application, the computer-readable storage medium may be any tangible medium that encompasses or stores a program. The program may be used by or in connection with an instruction execution system, apparatus, or device. The program codes encompassed on the computer-readable storage medium may be transmitted via any suitable medium, including, but not limited to: a wireless, wired and optic cable, a radio frequency, etc., or any suitable combination of the above.

In the embodiment of the present application, a computer program product is further provided. When running on a computer, the computer program product causes the computer to perform the warming-up control method for the fuel cell system in the starting process.

It should be noted that the relational terms herein such as "first" and "second" are used only to differentiate an entity or operation from another entity or operation, and do not require or imply any actual relationship or sequence between these entities or operations. Furthermore, the terms "include", "comprise", or any variants thereof are intended to cover a non-exclusive inclusion, so that a process, method, article, or equipment that includes a series of elements not only includes those elements, but also includes other elements not listed explicitly, or includes inherent elements of the process, method, article, or equipment. In the absence of more limitations, an element defined by "include a . . . " does not exclude other same elements existing in the process, method, article, or equipment including the elements.

The above is only the specific implementation of the present application, so that those skilled in the art can understand or implement the present application. Various modifications to these embodiments will be readily apparent to those skilled in the art, and the generic principles defined herein may be implemented in other embodiments without departing from the spirit or scope of the present application. Therefore, the present application is not intended to be limited to these embodiments shown herein, but is to be in accordance with the widest scope consistent with the principles and novel features disclosed herein.

What is claimed is:

1. A warming-up control method for a fuel cell system in a starting process, comprising:
    (a) starting the fuel cell system, introducing hydrogen and air into a stack, turning on a small-cycle cooling circuit, and pull-loading an output power of the fuel cell system to a first power;
    (b) running the fuel cell system at the first power, and monitoring an inlet temperature of the stack in real time;
    (c) in response to the inlet temperature reaching a first temperature, proceeding to step (d);
    (d) rotating a three-way valve at a first rotating rate, so as to simultaneously gradually turn on a large-cycle cooling circuit and gradually turn off the small-cycle cooling circuit;
    (e) monitoring a cell voltage value of the stack in real time, and calculating a voltage variance based on the cell voltage value;
    (f) in response to the voltage variance being smaller than or equal to a first threshold, returning to step (d) until all turn-on of the large-cycle cooling circuit and all turn-off of the small-cycle cooling circuit;
    (g) subsequent to all turn-on of the large-cycle cooling circuit and all turn-off of the small-cycle cooling circuit, pull-loading the output power of the fuel cell system to a rated power;
    (h) in response to the voltage variance being larger than the first threshold and smaller than or equal to a second threshold, rotating the three-way valve at a second rotating rate until the voltage variance is smaller than or equal to the first threshold, and returning to step (d), wherein the second rotating rate is smaller than the first rotating rate;
    (i) in response to the voltage variance being larger than the second threshold and smaller than or equal to a third threshold, decreasing the output power of the fuel cell system from the first power to a second power;
    (j) running the fuel cell system at the second power, and monitoring the inlet temperature of the stack in real time;
    (k) in response to the inlet temperature reaching a second temperature, rotating the three-way valve at a third rotating rate until the voltage variance is smaller than or equal to the first threshold, and returning to the step of rotating a three-way valve at a first rotating rate, wherein the third rotating rate is smaller than the second rotating rate, and the second temperature is smaller than the first temperature; and
    (l) in response to the voltage variance being larger than the third threshold, determining that the fuel cell system fails and stopping starting of the fuel cell system.

2. The method according to claim 1, further comprising: increasing amounts of the hydrogen and air introduced while rotating the three-way valve at the third rotating rate.

3. The method according to claim 1, further comprising:
    in response to the voltage variance being larger than the first threshold and smaller than or equal to the second threshold, triggering a level-one warming-up alarm;
    in response to the voltage variance being larger than the second threshold and smaller than or equal to a third threshold, triggering a level-two warming-up alarm; and
    in response to the voltage variance being larger than the third threshold, triggering a level-three warming-up fault.

4. The method according to claim 1, wherein the pull-loading an output power of the fuel cell system to a first power comprises:
    pull-loading the output power of the fuel cell system to the first power at a preset pull-loading rate.

5. The method according to claim 1, wherein the first rotating rate is 20°/s, the second rotating rate is 10°/s, and the third rotating rate is 5°/s.

6. The method according to claim 1, wherein the first threshold is 200 mV, the second threshold is 400 mV, and the third threshold is 1000 mV.

7. A computer-readable storage medium in which a computer program is stored, characterized in that a computer program, when being executed by a processor, implements the method of claim 1.

* * * * *